(12) United States Patent
Bedingfield

(10) Patent No.: US 7,664,244 B2
(45) Date of Patent: Feb. 16, 2010

(54) METHOD AND SYSTEM FOR PROVIDING CALLING NUMBER RESTORAL

(75) Inventor: James C. Bedingfield, Lilburn, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 988 days.

(21) Appl. No.: 10/642,403

(22) Filed: Aug. 18, 2003

(65) Prior Publication Data

US 2005/0259804 A1 Nov. 24, 2005

Related U.S. Application Data

(63) Continuation of application No. 09/468,888, filed on Dec. 22, 1999, now Pat. No. 6,633,633.

(51) Int. Cl.
*H04M 3/42* (2006.01)
(52) U.S. Cl. .............................. 379/201.11; 379/201.01; 379/210.03; 379/211.02; 379/212.01
(58) Field of Classification Search ............ 379/211.02, 379/142.15, 246, 88.25, 201.11, 210.03, 379/201.01, 212.01, 242; 709/225; 726/11
See application file for complete search history.

(56) References Cited

U.S. PATENT DOCUMENTS

| 5,778,052 | A | * | 7/1998 | Rubin et al. ............. 379/88.25 |
| 5,805,820 | A | * | 9/1998 | Bellovin et al. ............. 709/225 |
| 5,832,072 | A | * | 11/1998 | Rozenblit .................... 379/246 |
| 5,958,052 | A | * | 9/1999 | Bellovin et al. ............... 726/11 |

* cited by examiner

*Primary Examiner*—Thjuan K Addy
(74) *Attorney, Agent, or Firm*—Parks IP Law LLC; Jennifer Pearson Medlin, Esq.

(57) ABSTRACT

A system and method for restoring the original calling number in a call routed through an out-of-network enhanced service provider to a forwarding destination. The system comprises a service control point, a service switching point in communication with the service control point, and an enhanced service provider service node in communication with the service switching point, wherein the service node is located outside of a network while the remaining components reside within the network, and wherein the service switching point is provisioned with two triggers: an incoming trigger for calls to the service node and an outgoing trigger for calls from the service node. According to the method, the service control point, in response to the incoming trigger, removes and stores the private call information of a call exiting the network and, in response to the outgoing trigger, restores that private call information to the call once the call re-enters the network.

25 Claims, 3 Drawing Sheets

METHOD AND SYSTEM FOR PROVIDING CALLING NUMBER RESTORAL

This application is a continuation application of U.S. patent application Ser. No. 09/468,888 filed Dec. 22, 1999 and now U.S. Pat. No. 6,633,633, the contents of which is hereby incorporated by reference in its entirety.

BACKGROUND

1. Field of the Invention

The present invention relates to the field of switched telephony, and more particularly, to a method and system for providing a telephone routing service that restores a calling number in a call that has been processed by a non-network service provider and rerouted to an alternate destination.

2. Background of the Invention

Many Advanced Intelligence Network (AIN) telephone services use the capabilities of a service node (also referred to as a service circuit node) for intelligent call routing. In a typical routing scheme, the service node (SN) accepts an incoming call, executes service-related logic, places an outgoing call in accordance with the service logic, and terminates the incoming call to the outgoing call to complete the connection. Usually, the destination of the outgoing call is a telephone number different from the original called number.

AIN networks use a complex, high speed, high traffic volume data packet-switched messaging system to provide versatility in the handling of telephone calls. The Advanced Intelligent Network System is described in U.S. Pat. No. 5,701,301 and U.S. Pat. No. 5,838,774, which are hereby incorporated by reference in their entirety.

The AIN enables telecommunications call control and database access from any computer or switching system connected to the Signaling System 7 (SS7) network. The Signaling System 7 network refers to the current implementation of the common channeling interoffice signaling control network used in the United States. The Advanced Intelligent Network (AIN) is a standard call control protocol that uses the SS7 network for message transport.

AIN infrastructures of the public switched telephone network include service switching points (SSPs), service nodes, signaling transfer points (STPs), and service control points (SCPs) with databases. The service control point is a computer that holds, accesses, and maintains one or more databases, performs service logic, and communicates with service switching points in directing call routing. Databases typically store subscriber-specific information used by the network to route calls. The service switching point communicates with the service control point and queries the service control point for subscriber-specific or network-specific instructions as to how calls should be completed. The signaling transfer point is a packet switch that shuttles signaling messages between AIN network elements. The service node is a computer system that can perform service logic, can communicate with parties via voice circuits, and can assess incoming call information and make appropriate connections. In most implementations of a public switched telephone network, service control points and service switching points are provided in redundant mated pairs to ensure network reliability. Also, typically, service control points are within a network, while service nodes typically can be within or outside of a network.

Much of the intelligence and the basis for many of the new enhanced features of the network reside in the local service control point. As known by those skilled in the art, service control points are physically implemented by relatively powerful fault tolerant computers. Typical implementation devices include the Star Server FT Model 3200 and the Star Server FT Model 3300, both available from Lucent Technologies™. The architecture of these computers is based on Tandem Integrity S2 and Integrity S1 platforms, respectively.

The service control points maintain the network databases used in providing custom services, such as databases that identify customers requiring particular services. To keep the processing of data and calls as simple and as generic as possible at switches, triggers are defined at the switches for each call. Triggers may be assigned to a particular subscriber line or call, and prompts a query to a service control point. The service control point then checks its database to determine how to route the call and whether a customized calling feature or custom service should be implemented for this particular call. The results of the data base inquiry are sent back to the switch from the service control point. The return message includes instructions to the switch as to how to process the call. The instruction may be to take some special action as a result of a customized calling service or custom feature. If a "continue" message is received at the switch from the service control point, the switch moves through its call states, selects the call digits, and may generate further messages that will be used to set up and route the call, as described above.

FIG. 1 illustrates a typical AIN architecture that uses the call processing, routing, and connection capabilities of a service node to provide a call forwarding service. For a typical terminating service, caller 100 places a call (call 1) to a subscriber's telephone number, which flows through the caller's service switching point 102 and hits a trigger on the subscriber's service switching point 104. The trigger initiates a query (query 1) to a service control point 112 through a signaling transfer point 110. In response to query 1, service control point 112 returns response 1, directing service switching point 104 to forward call 1 to service node 116 that provides the call forwarding processing. Service switching point 104 forwards call 1 to service node 116 through service switching point 106. When it receives incoming call 1, service node 116 identifies the subscriber by the called number of call 1 and looks up the subscriber's desired forwarding, destination in a database. Service node 116 then places an outgoing call (call 2) to that forwarding destination (through service switching points 106 and 108) and, when answered at the subscriber's forwarding destination 118, terminates the incoming call 1 to the outgoing call 2 to complete the call connection.

Because, according to current network signaling capabilities, service node 116 places outgoing call 2 to complete the connection, the calling number of outgoing call 2 is the telephone number associated with the trunk group of service node 116. Thus, to the subscriber's forwarding destination 118, call 2 appears to originate from service node 116, instead of caller 100. This drawback of the service node function negates telephone services and call processing functions that may need to know the identity of the caller, such as caller identification ("caller ID").

This drawback is further compounded when service node 116 is outside a local exchange carrier's local access transport area (LATA—hereinafter referred to as "the network") and call 1 contains private call information. In such a situation, the local exchange carrier is prohibited by federal regulation to forward private call information to service node 116. Thus, a local exchange carrier cannot manipulate dialing strings to pass the private call information through service node 116 to subscriber's forwarding destination 118. This additional drawback is quite significant when considering the large number of telephone services supported by non-LEC telephone service providers, which are typically referred to as enhanced service providers (ESPs).

Supported by an out-of-network service node, an enhanced service provider, also known as an information provider, is an unregulated (by the Federal Communications Commission) vendor that adds value to telephone lines using software and hardware external to the network of a local exchange carrier. The enhanced service provider supplements a local exchange carrier's standard offerings, supporting advanced call features such as voicemail, flexible call forwarding, single number service, call screening service (e.g., routing or blocking telephone calls based on the calling party), announcement service, or database processing (e.g., a database that provides the latest airline fares). These enhanced services are offered over common carrier transmission facilities used in interstate communications, which employ computer processing applications that act on the format, content, code, protocol or similar aspects of the subscriber's transmitted information; provide the subscriber additional, different or restructured information; or involve subscriber interaction with stored information. In other words, these enhanced services are computer processing applications that manipulate in some way the information transmitted over the telephone lines.

For example, with a flexible call forwarding telephone service, a service node receives from a calling party an incoming call to the called party (subscriber). In response, the service node determines the forwarding destination, determines how to route the call (including, for example, which outgoing port to use), sets up appropriate billing and call identity information, places an outgoing call to the forwarding destination, connects the incoming call to the outgoing call, and drops out to leave the calls connected at the service switching point to save the resources of the service node.

For single number service, a service node receives an incoming call, consults a database to determine a group of phone numbers to simultaneously ring, places outgoing calls to each phone number in the group, and connects the incoming call to the outgoing call that is first answered. Like flexible call forwarding, once the incoming and outgoing calls are connected, the service node drops out resulting in a single call via the public switched telephone network.

To execute these services, a call to a subscriber of an enhanced service is re-directed from the subscriber's telephone number to a service node in communication with the enhanced service provider, and once the service node completes the call processing, to an alternate destination dictated by the enhanced service. As described above, because a service node completes the connection to the forwarding destination, the original calling number of the caller is replaced by the service node number. Further, because the service node in communication with the enhanced service provider is outside of the local exchange carrier's network and because the enhanced service provider is unregulated, the local exchange carrier cannot forward private call information to the enhanced service provider for insertion into the outgoing call from the service node to the forwarding destination.

SUMMARY OF THE INVENTION

The present invention is a system and method for restoring the original calling number in a call routed through an out-of-network enhanced service provider to a forwarding destination. The system comprises a service control point, a service switching point in communication with the service control point, and a service node of an enhanced service provider in communication with the service switching point. For purposes of the present invention, the service node is located outside of a local exchange carrier's network while the remaining components reside within the network. Further, the service switching point is provisioned with two triggers: an incoming trigger for calls to the service node and an outgoing trigger for calls from the service node.

According to the method of the present invention, a call to the service node hits the incoming trigger, prompting the service switching point to send the call information to the service control point. The service control point records the call information in a database, removes all private call information (e.g., calling party number if the call is from a private number), and sends the remaining call information with the call to the service switching point for forwarding to the service node outside of the network. After processing the call using the remaining call information, the service node places an outgoing call in accordance with the enhanced service that it is providing. This outgoing call enters the network and hits the outgoing trigger at the service node's service switching point, prompting that service switching point to query the service control point for call information and routing instructions. The service control point retrieves the private call information it previously recorded (in response to the incoming trigger), rearranges the call information of the outgoing call to include the private call information, and returns the call information and routing instructions to the service switching point. Accordingly, the service switching point forwards the outgoing call to the forwarding destination, which now can access the private information (e.g., the originating number of the call).

Broadly stated, the present invention removes and stores the private call information of a call exiting the network and restores that private call information to the call once the call re-enters the network. To the benefit of call processing downstream of the present invention, the call contains the same call information with which it originated and appears as if it was never screened to flow outside the network. Thus, the system and method of the present invention enable a local exchange carrier to provide enhanced services from outside the network, to preserve the integrity of private call information, and to restore the private call information so as not to adversely impact subsequently provided services. The net result is an increase in the number, quality, and scope of telecommunications services enhanced service providers can provide to consumers and, consequently, an increase in subscribership and profits for the local exchange carrier, all while maintaining compliance with federal regulations.

A further advantage of the present invention is its applicability to any out-of-network enhanced service. Thus, a local exchange carrier can package the present invention as a tariff and offer it publicly to all enhanced service providers. (A tariff is a public document filed by a common carrier, regulated telephone company, which details the features, equipment, and pricing of a service provided by the telephone company, or local exchange carrier.) With the tariff, the local exchange carrier can provide the service both to affiliated and non-affiliated enhanced service providers and can collect the corresponding fees. Packaging the present invention as a tariff and offering it to a large number of customers generates increased profits for the local exchange carrier.

Another advantage of the present invention is the ability to protect the integrity of private call information and to support multiple concurrent enhanced service processes without being restricted by limited memory. The service node provides this expanded memory capability, especially when compared to the limited memory capacity of other AIN components such as service switching points.

Accordingly, it is an object of the present invention to provide an out-of-network enhanced service without compromising the effectiveness of subsequently provided telephone services, e.g., caller ID service.

It is another object of the present invention to provide a system and method for restoring the calling number in a call that has been routed outside of a local exchange carrier's network for processing by an enhanced service provider and rerouting to a forwarding destination.

It is another object of the present invention to remove private call information from a call exiting the network and to restore that private call information to the call when it reenters the network.

It is another object of the present invention to provide a calling number restoral service that can be offered as a tariff package to all enhanced service providers to increase the profits of a local exchange carrier.

These and other objects of the present invention are described in greater detail in the detailed description of the invention, the appended drawings, and the attached claims.

DETAILED DESCRIPTION OF THE INVENTION

Figure 1:
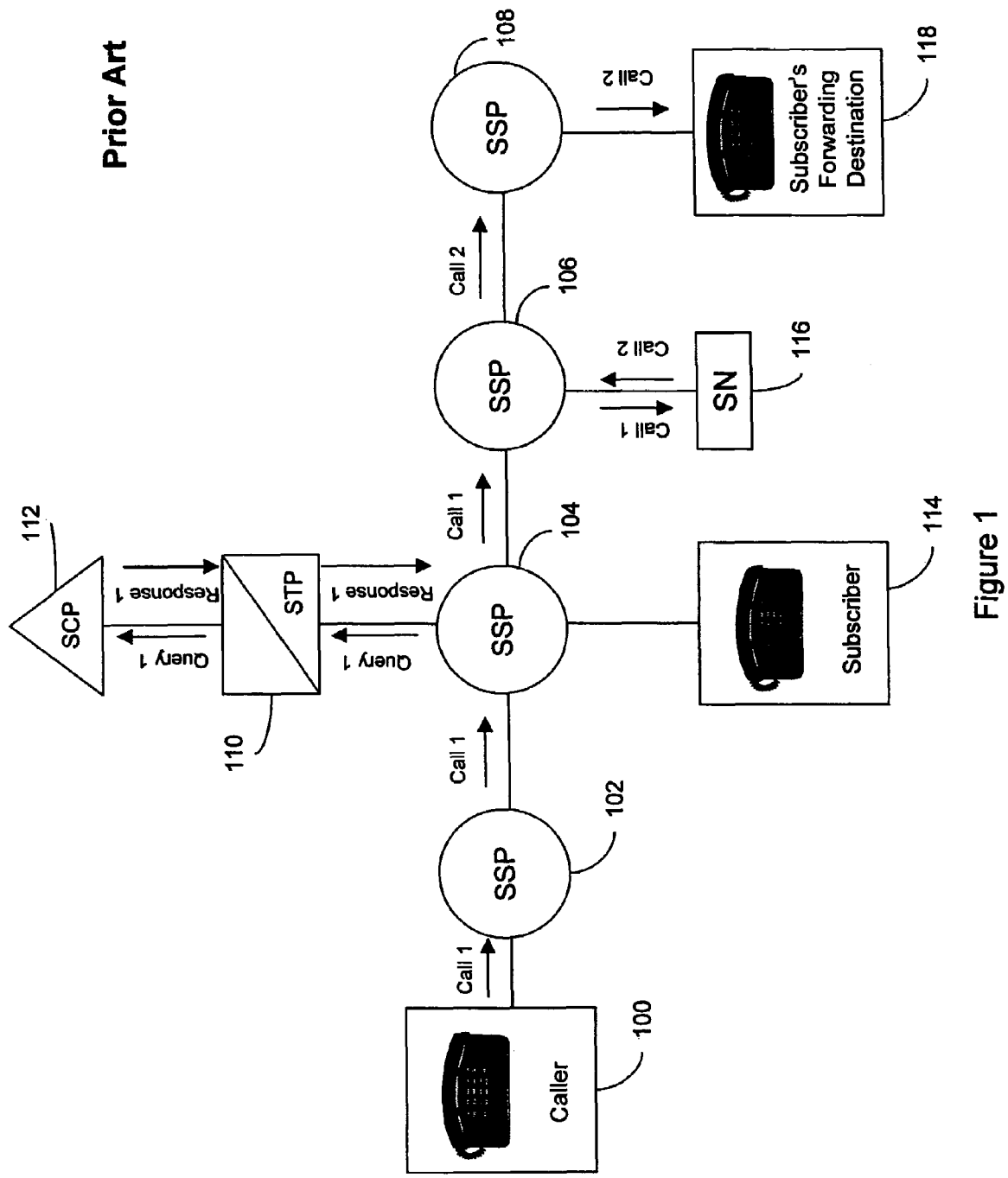
FIG. 1 is a schematic diagram of a prior art system architecture that uses a service node to complete call routing and termination.
Figure 2:
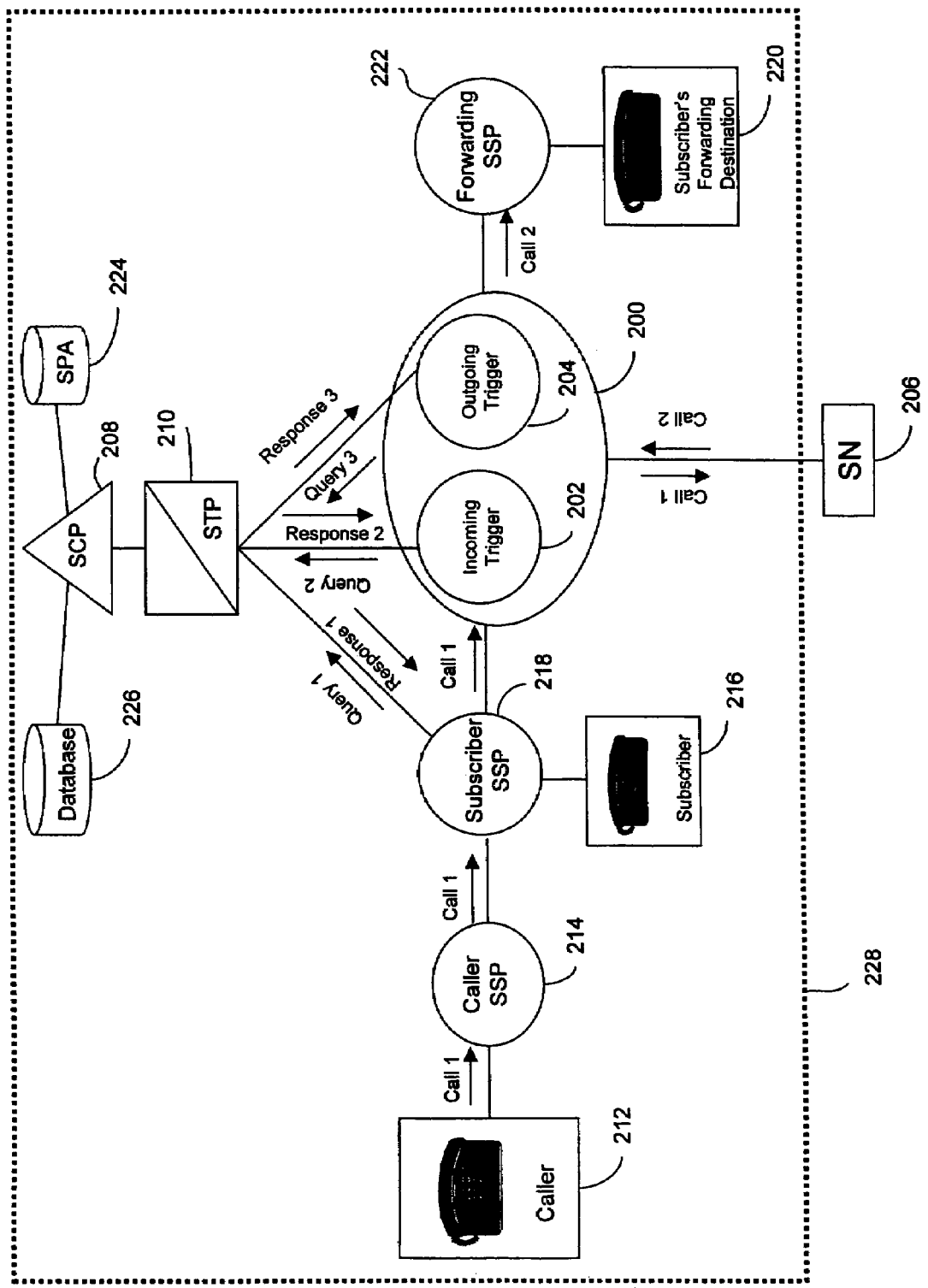
FIG. 2 is a schematic diagram of the system architecture of the present invention, shown in the context of a call forwarding service.

Referring to FIG. 2, the primary components of the present invention are a service switching point 200 provisioned with an incoming trigger 202 and an outgoing trigger 204, a service node 206 in communication with service switching point 200, and a service control point 208 in communication with service switching point 200 through a signaling transfer point 210. To provide a complete call flow architecture, the present description further includes a caller 212 in communication with a caller's service switching point 214, a subscriber 216 in communication with a subscriber's service switching point 218, and a forwarding destination 220 in communication with a forwarding service switching point 222. Caller's service switching point 214 is in communication with subscriber's service switching point 218 and, through signaling transfer point 210, with service control point 208. Forwarding service switching point 222 is in communication with service switching point 200.

As contemplated by the present disclosure, service node 206 is outside the local exchange carrier's network and, as such, may not receive private call information. To comply with this federal regulation, the present disclosure uses incoming trigger 202 to remove and store the private information before the call leaves the network to go to service node 206, and restores the private call information to the call when the call hits outgoing trigger 204 on its way back into the network.

System Architecture

The present invention is based on a service node-type architecture and can be applied to any enhanced service that requires a service node or similar device for call routing or processing. As used in the specification and in the claims, service nodes include all similar devices that perform the functions described herein including, for example, personal computers with integrated services digital network basic rate interfaces. FIG. 2 illustrates an architecture representative of the present invention.

Although FIG. 2 depicts a separate service switching point for each subscriber number and service node, one skilled in the art would understand that each component could be connected to the same service switching point. Further, the service node could be connected to one or more service switching points. In addition, although FIG. 2 shows one service node providing the enhanced service, one or more service nodes with one or more enhanced services could provide several out-of-network enhanced call processing services.

Turning to the individual components, service node 206 is associated with an enhanced service provider that is outside the local exchange carrier's network, the boundary of which is represented by the dotted line 228 in FIG. 2. The enhanced service provider could be any call processing service that supplements a local exchange carrier's available call plan, such as voicemail or single number service.

Service switching point 200, with its incoming trigger 202 and outgoing trigger 204, acts as a gatekeeper within the network, preventing private call information from exiting the network. Upon receiving a call to service node 206, incoming trigger 202 queries service control point 208 to remove and store private call information. Once service node 206 has completed call processing and has placed an outgoing call, outgoing trigger 204 queries service control point 208 to restore the private call information.

Service control point 208 receives queries from subscriber's service switching point 218 and service switching point 200. In response, service control point 208 determines the services applicable to each call and issues corresponding call routing instructions to the service switching points. In the preferred embodiment of the present invention, service control point 208 is provisioned with a service package application (SPA) 224 and a database 226. Service package application 224 is a computer program that directs the actions of service control point 208 to provide the functions of the present invention. Database 226 is an organized and structured data collection in which service control point 208 stores call information. Preferably, the call information includes call data such as the calling number, the called number, the privacy indicator of the calling number, and a transaction identification.

Caller 212 and subscriber 216 are any telephony devices, e.g., telephones or facsimile equipment, that are capable of initiating and receiving telephone calls. In the context of the present invention, subscriber 216 does not receive a telephone call because the trigger provisioned on subscriber's service switching point 218 redirects the calls to service node 206.

Finally, subscriber's forwarding destination 220 is any destination that may need to know the calling party information, i.e., the telephone number of caller 212. Subscriber's forwarding destination 220 could be a telephony device or, perhaps, another call service that further processes the call. However, to provide a simple illustration of the present invention, the preferred embodiment of subscriber's forwarding destination 220 is a standard telephone with a caller ID display. Thus, in this preferred embodiment, for the caller ID service to operate properly, the subscriber's forwarding destination 220 must receive the calling party information and the associated privacy indicator, so that the caller ID display shows the telephone number of caller 212 if the call is not private, "private" if the call is private, or "unavailable" if the originating or intermediate network is unable to deliver the calling party information (e.g., if the call originates from Private Branch Exchange equipment or from within a network that does not support SS7 signaling).

System Operation

Figure 3:
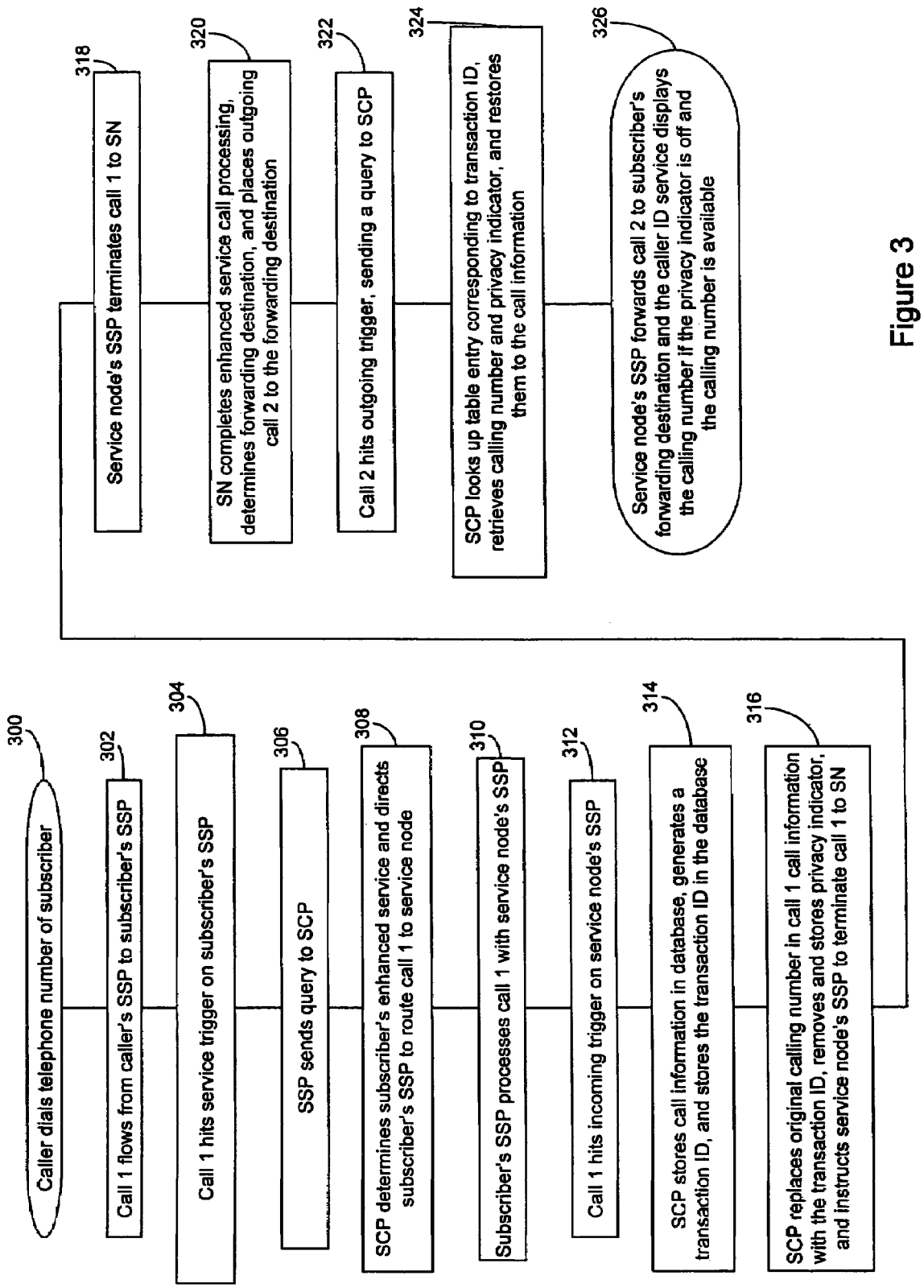
FIG. 3 is a flowchart tracing the steps of the call flow of FIG. 2, described in the context of a call forwarding service.

FIGS. 2 and 3 illustrate the call flow of a preferred embodiment of the present invention. FIG. 2 is schematic of the system architecture showing calls, queries, and responses between the system components. (Although the queries and responses are not shown between the signaling transfer point 210 and service control point 206 for clarity, one skilled in the art would understand that the queries reach service control point 208 via signaling transfer point 210 and that the responses originate from service control point 208 and flow through signaling transfer point 210.) FIG. 3 is a flowchart that corresponds to FIG. 2 and summarizes the steps of the method of the present invention. Although the present invention is applicable to any situation in which an out-of-network service node processes a call, the schematic of FIG. 2 and the flowchart of FIG. 3 trace the operation of the present invention in the context of call forwarding. While the method described herein and illustrated in the figures contains many specific examples of call flow steps, these steps should not be construed as limitations on the scope of the invention, but rather as examples of call flow steps that could be used to practice the invention. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

As FIG. 3 shows, in step 300 caller 212 dials the telephone number of subscriber 216. In step 302, this incoming call (call 1 in FIG. 2) flows from caller's service switching point 214 to subscriber's service switching point 218.

In step 304, incoming call 1 activates a service trigger provisioned on subscriber's service switching point 218. Preferably, this service trigger is a termination attempt trigger, although other types of triggers could be used (e.g., Public Office Dialing Plan triggers). The termination attempt trigger initiates a query to service control point 208 to implement the particular service to which the called party has subscribed, e.g., simultaneous ring service, and is provisioned on subscriber's service switching point 218 during initiation of that service.

In step 306, subscriber's service switching point 218 sends a query (query 1 in FIG. 2) via signaling transfer point 210 to service control point 208 asking for routing instructions. In step 308, service control point 208 looks up the subscriber's calling plan to determine the subscriber's enhanced service and directs subscriber's service switching point 218 to route call 1 to service node 206 of the enhanced service (response 1 in FIG. 2). Following the directions of service control point 208, subscriber's service switching point 218 processes the incoming call 1 with service switching point 200 in step 310.

In step 312, the incoming call 1 hits incoming trigger 202 provisioned on service switching point 200. Preferably, incoming trigger 202 is a termination attempt trigger or similar trigger that activates for all calls destined for service node 206. Activating incoming trigger 202 sends a query (query 2 in FIG. 2) to service control point 208 that includes the call information of the incoming call 1. In the preferred embodiment of the present invention, the call information includes data such as the calling number, the called number, the privacy indicator, and the destination number (the telephone number associated with the trunk group of service node 206). The calling number and the privacy indicator are the private information, which may not be transmitted outside the network by the telephone company.

In step 314, service control point 208 stores the call information in a database table in database 226. In addition, service control point 208 generates a transaction identification for the incoming call 1 and enters the transaction identification in the table entry with the rest of the call information. This transaction identification marks the database location at which the private information related to call 1 is stored while call 1 flows outside the network. Additionally, the transaction identification may be used to provide service to a specific caller without revealing the caller's identity. In the preferred embodiment of the present invention, the transaction identification is a series of digits long enough to distinguish between the multiple calls being concurrently processed by service control point 208. For example, the transaction identification could be digits of the year, month, day, hour, minute, and second, followed by a string of random digits.

Optionally, the transaction identification could encode the identity of a caller so that the present invention could provide an enhanced service without revealing the identity of the caller to the enhanced service provider (in compliance with regulations). For example, with an announcement service that plays one message to friends and another message to business associates, the encoded transaction identification would mark the caller as either a friend or business associate so that the enhanced service provider could play the appropriate message.

In step 316, service control point 208 replaces the original calling number in the call 1 call information with the transaction identification, removes the privacy indicator, and instructs service switching point 200 to terminate call 1 with the modified call information to service node 206. Thus, for example, the call 1 call information "callingnumber,callednumber,privacyindicator,destinationnumber" would be modified to "transID,callednumber,destinationnumber", where the destination number is the telephone access number for service node 206. As a result of replacing the calling number in the call information with the transaction identification, service switching point 200 will include the transaction identification in the appropriate calling number field, depending upon the type of interface between the service switching point 200 and service node 206. For example, with an integrated services digital network basic rate interface (ISDN/BRI), service switching point 200 could include the transaction identification as part of the call setup signaling. As another example, even with a regular analog interface, service switching point 200 could include the transaction identification using touch tones generated by service switching point 200 over the interface. Alternatively, in addition to the calling number field, the transaction identification could be placed in other data fields of the signaling message.

Instead of including the full transaction identification in the call information, an alternate embodiment of the present invention uses an abbreviated form of the transaction identification, referred to as a transaction key. The transaction key is an excerpt of the transaction identification that contains enough digits so as to correspond to only the one transaction identification without being mistakenly matched to another transaction identification. This abbreviated form accommodates signaling interfaces between service switching point 200 and service node 206 that can only handle a limited number of characters.

Following the instructions of service control point 208, service switching point 200, to which the enhanced service provider is connected, terminates the call to service node 206 in step 318. In step 320, service node 206 completes the call processing associated with the enhanced service, determines the corresponding forwarding destination, and places an outgoing call (call 2 in FIG. 2) to that forwarding destination. Preferably, the dialing string for outgoing call 2 begins with a customized dialing plan code, e.g., 9, so that when the call reaches service switching point 200 it triggers a query to the service control point 208. In this embodiment, the outgoing trigger is preferably a customized dialing plan trigger. As an example, this call information could be "9,transID,forwardingdestinationnumber,#", where the forwarding destination number is determined by service node 206 based on the subscriber's enhanced service, and the "#" character delimits the end of the dialing string. Alternatively, outgoing trigger 204 could be a feature code trigger. In this embodiment, the dialing string begins with the feature code, e.g., *9.

In step 322, outgoing call 2 hits an outgoing trigger 204 provisioned on service switching point 200, sending a query (query 3 in FIG. 2) to service control point 208. Query 3 includes the forwarding destination number (as dictated by the call processing of the enhanced service provider) and the transaction identification, as received from service control point 208 in step 316. Alternatively, instead of the full transaction identification, query 3 may include a transaction key if a transaction key was delivered in step 316.

Noting the transaction identification, in step 324, service control point 208 looks up the corresponding table entry, retrieves the calling party number and privacy indicator from the table entry in database 226, and modifies the call information of the outgoing call to include the calling party number and privacy indicator. Thus, the call information is changed from "*9,transID,forwardingdestinationnumber" to "originalcallingnumber,privacyindicator,forwardingdestinationnumber". Service control point 208 returns the call information to service switching point 200 with routing instructions directing the service switching point 200 to forward outgoing call 2 to the subscriber's forwarding destination 220.

Finally, in step 326, service switching point 200 sends outgoing call 2 to subscriber's forwarding destination 220 through service switching point 222. In this embodiment, subscriber's forwarding destination 220 is equipped with a caller ID service, which can read from the call information the calling party number and privacy indicator that were restored by service control point 208. Thus, the caller ID display at subscriber's forwarding destination 220 displays the calling number if the privacy indicator is off, displays "private" if the privacy indicator is on, or "unavailable" if the originating or intermediate network is unable to deliver the calling party information. After viewing the caller ID display, if the subscriber answers the telephone, service node 206 terminates call 1 to call 2 to complete the call connection, and drops out of the call. Thus, only the caller and the subscriber's forwarding destination are on the line, freeing service node 116's resources for future calls.

In addition to the caller ID service illustrated above, other call services may need to know the calling number and the privacy indicator to operate properly. To meet these services' needs, in the preferred embodiment of the present invention, service control point 208 directs service switching point 200 to forward the calling number even if the privacy indicator is on. In this manner, downstream services within the network can use the calling number for call processing needs, yet still keep it private if the privacy indicator is on. Without the restoral advantages of the present invention, out-of-network enhanced service providers could never meet the needs of downstream call services because the enhanced service providers do not receive the private information.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for a communications network to restore private communication information to a communication that is redirected to an out-of-network entity, comprising:
   receiving a request from an in-network calling number for a communication directed to an in-network called number;
   determining that the communication is to be redirected to an out-of-network entity;
   removing the private communication information from the communication and storing the private communication information after determining that the communication is to be redirected to the out-of-network entity;
   redirecting the communication originally directed to the called number to the out of network entity;
   receiving, into the network, an outgoing communication from the out-of-network entity;
   retrieving private communication information and adding the private communication information into the outgoing communication; and
   sending the outgoing communication including the private communication information to a destination in the network.

2. The method of claim 1, wherein removing and storing the private communication information comprises:
   receiving the communication at a routing module and activating, a trigger provisioned on the routing module;
   sending a query to a database at a control module in communication with the routing module;
   recognizing, at the control module, that the communication is to the out-of-network entity; and
   removing the private communication information using the control module, and storing the private communication information in a database in communication with the control module.

3. The method of claim 1, wherein retrieving the private communication information and adding the private communication information into the outgoing communication comprises:
   generating a transaction identification, storing the transaction identification with the private communication information, and attaching the transaction identification to the communication, before forwarding the communication outside the network;
   activating trigger provisioned on a routing module;
   sending a query to a control module in communication with the routing module;
   recognizing, at the control module, that the outgoing communication is from the out-of-network entity; and
   locating, the private communication information using the transaction identification, and inserting the private communication information in the outgoing communication.

4. The method of claim 1, wherein the outgoing communication is a call and the call includes a customized dialing plan code and the trigger is a customized dialing plan trigger.

5. The method of claim 1, wherein the out-of-network entity provides an enhanced service selected from the group consisting essentially of a call forwarding service, a call screening service, and an announcement service.

6. A method for a network to restore private communication information to an outgoing communication from an entity external to the network, comprising:

receiving a request from a calling number hr an incoming communication directed to a called number;

determining that the incoming communication is to be redirected to the entity external to the network;

removing and storing the private communication information of the incoming communication due to determining that the incoming communication is to be redirected to the entity external to the network;

associating a transaction identification with the private communication information and the incoming communication;

redirecting the incoming communication originally directed to the called number to the entity external to the network;

receiving the outgoing communication with the transaction identification from the incoming communication;

retrieving the private communication information using the transaction identification; and inserting the private communication information into the outgoing communication.

7. The method of claim 6, wherein the private communication information is a calling number and a privacy indicator of the incoming communication.

8. The method of claim 6, wherein the entity external to the network determines a forwarding destination according to an enhanced service that the external entity provides and initiates the outgoing communication to the forwarding destination.

9. The method of claim 8, further comprising:

sending the outgoing communication to the forwarding destination; and terminating the incoming communication to the outgoing communication.

10. A system for providing, calling number restoral, comprising:

a routing module provisioned, with an incoming trigger and an outgoing trigger;

an out-of-network entity in communication with the routing, module; and a control module in communication with the routing module, wherein, the system determines that a call originally directed to an in-network called number is to be redirected to an out-of-network entity, removes and stores the private call information from the call after determining that the call is to be redirected to the out-of-network entity, redirects the call originally directed to the in-network called number to the out-of-network entity after removing and storing the private call information, and restores the stored private call information to the call when the call re-enters the network from the out-of-network entity.

11. The system of claim 10, wherein the incoming trigger sends a first query to the routing module in response to receiving the call to the out-of-network entity.

12. The system of claim 11, wherein the first query prompts the routing module to remove and store the private call information from the call, to generate a transaction identification, to store the transaction identification with the stored private call information, to attach the transaction identification to the call, and to redirect the call to the out-of-network entity.

13. The system of claim 12, wherein the outgoing trigger sends a second query to the routing module in response to receiving the call from the out-of-network entity.

14. The system of claim 13, wherein the second query prompts the routing module to locate the private call information and insert the private call information into the call based on the transaction identification.

15. The system of claim 10, wherein the out-of-network entity serves an enhanced service provider.

16. The system of claim 10, wherein the out-of-network entity receives an incoming call, places an outgoing call, and terminates the incoming call to the outgoing call to complete a call connection.

17. The system of claim 10, wherein the out-of-network entity communicates with the routing module through an integrated services digital network basic rate interface.

18. The system of claim 10, further comprising:

a database provisioned at the control module; and a service package application provisioned at the control module.

19. A routing module residing within a network for removing, storing, and restoring private communication information of an out-of-network communication, comprising:

means for communication with a control module residing within the network for determining that a communication is to be redirected to an out-of-network entity based on a called number, for removing and storing, the private communication information from the communication, for redirecting the communication originally directed to the called number to the out-of-network entity and for restoring the private communication information to the out-of-network communication from the out-of-network communication entity prior to forwarding the out-of-network communication to a network entity;

means for communicating with an out-of-network entity;

an incoming trigger that sends a first query to the control module in response to receiving the communication; and an outgoing trimmer that sends a second query to the control module in response to receiving the out-of-network communication from the out-of-network entity destined for the network entity.

20. The routing module of claim 19, wherein the out-of-network entity provides an enhanced service.

21. The routing module of claim 19, wherein the control module removes and stores the private communication information in response to the first query and restores the private communication information in response to the second query.

22. A control module for preventing private communication information from exiting a network, comprising:

means for determining that a communication originally directed to an in-network called number is to be redirected to an out-of-network entity;

means for removing the private communication information from the communication after the determining means has determined that the communication is to be redirected to the out-of-network entity;

means for storing the private communication information removed by the removing means;

means for redirecting the communication to the out-of-network entity after the private communication information has been removed by the removing means and stored by the storing means;

means for retrieving the private communication information stored by the storing means when the communication re-enters the network from the out-of-network entity; and means for restoring the private communication information retrieved by the retrieving means to the communication.

23. The control module of claim 22, wherein the means for removing, the means for restoring, and the means for retrieving comprise a service package application.

24. The control module of claim 22, wherein the means for storing the private communication information comprises a database.

25. The control module of claim 22, wherein the means for retrieving the private communication information comprises a transaction identification.

* * * * *